(12) United States Patent
Al-Gahtani et al.

(10) Patent No.: US 7,864,951 B2
(45) Date of Patent: Jan. 4, 2011

(54) SCALAR MULTIPLICATION METHOD WITH INHERENT COUNTERMEASURES

(75) Inventors: Theeb A. Al-Gahtani, Riyadh (SA); Mohammad K. Ibrahim, Thurnby (GB)

(73) Assignee: King Fahd University of Petroleum and Minerals, Dhrahran (SA)

( * ) Notice: Subject to any disclaimer, the term of this patent is extended or adjusted under 35 U.S.C. 154(b) by 1212 days.

(21) Appl. No.: 11/456,257

(22) Filed: Jul. 10, 2006

(65) Prior Publication Data

US 2008/0019509 A1 Jan. 24, 2008

(51) Int. Cl.
*H04K 1/00* (2006.01)
*H04L 9/00* (2006.01)
*H04L 9/28* (2006.01)

(52) U.S. Cl. .............................. 380/28; 380/30; 380/44; 380/255; 713/176

(58) Field of Classification Search ................... 380/28, 380/30, 44, 255; 713/176
See application file for complete search history.

(56) References Cited

U.S. PATENT DOCUMENTS

| | | | |
|---|---|---|---|
| 4,200,770 A * | 4/1980 | Hellman et al. | 380/30 |
| 6,088,453 A * | 7/2000 | Shimbo | 380/28 |
| 6,876,745 B1 * | 4/2005 | Kurumatani | 380/28 |
| 7,483,534 B2 * | 1/2009 | Ibrahim | 380/44 |
| 7,505,587 B2 * | 3/2009 | Izu et al. | 380/30 |
| 7,555,122 B2 * | 6/2009 | Moller et al. | 380/30 |
| 7,639,808 B2 * | 12/2009 | Izu et al. | 380/255 |
| 2003/0123656 A1 * | 7/2003 | Izu et al. | 380/30 |
| 2005/0195973 A1 * | 9/2005 | Ibrahim | 380/28 |
| 2006/0093137 A1 * | 5/2006 | Izu et al. | 380/30 |
| 2007/0248224 A1 * | 10/2007 | Buskey et al. | 380/30 |
| 2009/0147948 A1 * | 6/2009 | Moller et al. | 380/30 |

* cited by examiner

*Primary Examiner*—Michael J Simitoski
*Assistant Examiner*—Kari L Schmidt
(74) *Attorney, Agent, or Firm*—Lowe Hauptman Ham & Berner, LLP

(57) ABSTRACT

An elliptic curve cryptosystem includes process to multiply a scalar value with an elliptic curve point. The processes provide a countermeasure against address-bit attacks. The processes have no correlation between the bit values of a scalar and the addresses of the operands of point addition and doubling operations and therefore provide countermeasures against power attacks.

9 Claims, 10 Drawing Sheets

100

INPUT K, P
OUTPUT KP
101. Initialize Q[0] = O, Q[1] = P
102. for $i = 0$ to $n-1$
103.   if $k[i] = 1$ then
104.     Q[0] = ADD(Q[0], Q[1])
105.   end if
106.   Q[1] = DBL(Q[1])
107. end for
108. return Q[0]

100

```
INPUT      K, P
OUTPUT     KP
    101. Initialize Q[0] = O, Q[1] = P
    102. for i = 0 to n-1
    103.     if k[i] = 1 then
    104.         Q[0] = ADD(Q[0], Q[1])
    105.     end if
    106     Q[1] = DBL(Q[1])
    107. end for
    108. return Q[0]
```

FIG. 1

```
INPUT        K, P
OUTPUT       KP
    201. Initialize Q[0] = P
    202. for i = n-2 downto 0
    203.    Q[0] = DBL(Q[0])
    204.    if k[i] == 1 then
    205.       Q[0] = ADD(Q[0],P)
    206.    end if
    207. end for
    208. return Q[0]
```

FIG. 2

INPUT  K, P
OUTPUT  KP
301.    Initialize Q[2] = P
302.    for $i = n\text{-}2$ down to 0
303.        Q[0] = DBL(Q[2])
304.        Q[1] = ADD(Q[0], P)
305.        Q[2] = Q[$k_i$]
306.    end for
        return Q[2]

FIG. 3

INPUT K, P
OUTPUT KP
401.    Initialize $Q[0] = P$; $Q[1] = 2P$
402. for $i = n-2$ down to 0
403.    $Q[2] = DBL(Q[k_i])$
404.    $Q[1] = ADD(Q[0], Q[1])$
405.    $Q[0] = Q[2-k_i]$,
406.    $Q[1] = Q[1+k_i]$
407. end for
        return $Q[0]$

FIG. 4

INPUT K, P
OUTPUT KP
701.    Initialize $Q[0] = P; Q[1] = 2P$
702. for $i = n-2$ down to $0$
703.    $Q[2] = Q[1 - (k_i \oplus k_{i-1})]$
704.    $Q[0] = ADD(Q[0], Q[1])$
705.    $Q[1] = DBL(Q[2])$
706. end for
    return $Q[1 - k_0]$

FIG. 7

INPUT K, P
OUTPUT KP
801.   Initialize $Q[0] = P$; $Q[1] = 2P$
802.   for $i = n\text{-}2$ down to 0
803.     $Q[2] = DBL(Q[1 - (k_i \oplus k_{i-1})])$
804.     $Q[0] = ADD(Q[1], Q[0])$
805.     $Q[1] = Q[2]$
806.   end for
        return $Q[1 - k_0]$ INPUT K, P
OUTPUT KP
901.   Initialize $Q[0] = P$(or $2P$); $Q[1] = 2P$(or $P$); $Q[2] = P$
902. for $i = n-2$ down to 0
903.     $Q[0] = ADD(Q[1], Q[0])$
904.     $Q[1] = ADD((Q[0], (-1)^{1-k_i} Q[2])]$
905. end for
    return $Q[1-k_0]$

FIG. 9

SCALAR MULTIPLICATION METHOD WITH INHERENT COUNTERMEASURES

TECHNICAL FIELD

The following description relates generally to cryptography and more particularly to cryptography using scalar multiplication in elliptic curves to provide inherent countermeasures for simple power, differential power, and address-bit attacks.

BACKGROUND

Cryptography provides privacy and authentication for remote communications and data storage. Privacy may be provided by encrypting data using symmetric cryptography. Symmetric cryptography uses a single mathematical key to encrypt and decrypt data. However, symmetric cryptography, whose algorithms use the same key to encrypt and decrypt a message require the sharing of a secret for authentication. Authentication may be provided using the functions of user identification, data integrity, and message non-repudiation.

Asymmetric or public-key cryptography enables encrypted communication between users who have not previously established a shared secret key. Public-key cryptography is based on key pairs. A key pair consists of a private key and a public key. The private key is only known by its owner, while the public key is typically associated with its owner in an authenticated manner and shared with others. The public key is used to encrypt the message, and the private key is used to decrypt the message. As a result, the encrypted message may be sent using an insecure channel with the assurance that only the intended recipient can decrypt it. Public key encryption may be interactive (e.g., encrypting a telephone conversation) or non-interactive (e.g., encrypting electronic mail).

Identification protocols may be used to provide user identification. For example, digital signature may be used to provide data integrity, message non-repudiation, and user identification. A public key is used to encrypt or verify a signature of a message, and a private key is used to decrypt or generate a signature of a message.

U.S. Pat. No. 4,200,770, entitled "CRYPTOGRAPHIC APPARATUS AND METHOD," describes the use of cryptographic key pairs and their application to the problem of key agreement over an insecure communication channel. The algorithms specified in U.S. Pat. No. 4,200,770 relies on the difficulty of the mathematical problem of finding a discrete logarithm for their security. U.S. Pat. No. 4,200,770 is hereby incorporated herein by reference in its entirety for all purposes.

Security of a discrete-logarithm based crypto algorithm may be undermined by performing the inverse of modular exponentiation (i.e., a discrete logarithm). Although mathematical methods for finding a discrete logarithm exist (e.g., the Number Field Sieve), these methods are hard to complete in a reasonable time period if certain conditions are met in the specification of the crypto algorithm, for example, if sufficiently large numbers are used. Large numbers require more time and computing power to find the discrete logarithm and break the cryptograph. However, large numbers result in long public keys and slow transmissions of cryptographic data. In addition, the use of very large numbers also requires longer processing times and greater computational power to perform the crypto algorithm. As a result, cryptographers continue to search for ways to minimize the size of the numbers used and the computational power required to perform the encryption and/or authentication algorithms.

SUMMARY

In one general aspect, an elliptic curve cryptosystem includes process to multiply a scalar value with an elliptic curve point. The processes provide a countermeasure against address-bit attacks. The processes have no correlation between the bit values of a scalar and the addresses of the operands of point addition and doubling operations and therefore provide countermeasures against power attacks.

In another general aspect, an elliptic curve cryptosystem including an input to receive an elliptic curve base point P to encrypt a message for transmission on an insecure medium; and a processor to encrypt the message by performing a multiplication process of a scalar value K with the elliptic curve point P including iterative steps of point addition and doubling operations, wherein the multiplication process has no correlation between bit values of the scalar and addresses of the operands of the point addition and doubling operations used to perform the multiplication process. The multiplication process provides a countermeasure to power analysis attacks and address bit analysis attacks.

The scalar value K may be represented in binary as:

$$K = k_{n-1}2^{n-1} + k_{n-2}2^{n-2} + \ldots + k_1 2 + k_0$$

where $k_i$ is the i-th bit of the binary representation of K, and n is the total number of bits.

The processor is configured to process the i-th bit of K, $k_i$ such that the selection of an input operand of a DBL operation is dependant on the existence of a transition between the values of bits $k_i$ and $k_{i-1}$ of the scalar, K, and not dependant on the value of $k_i$.

The processor also may be configured to perform the following steps to implement the multiplication process KP:

```
initialize variables Q[0] and Q[1] to P and 2P respectively;
for i = n-2 down to 0
    load the variable Q[2] with the contents of Q[0] or Q[1] based on
    the following:
        Q[2]   = Q[0] if there is a transition from 1 to 0 or from 0 to 1
                between k_i and k_{i-1} bits of the scalar K
                otherewise
               = Q[1];
    perform an addition operation on the contents of Q[0] and Q[1] and
    store the result in Q[0]; and
    perform a DBL operation on the contents of Q[2] and store the result
    in Q[1] end for; and
return Q[1- k_0].
```

The processor also may be configured to perform the following steps to implement the multiplication process KP:

```
initialize variables Q[0] and Q[1] to P and 2P respectively.
for i = n-2 down to 0
    perform DBL operation based on the following:
        Q[2]   = DBL(Q[0]) if there is a transition from 1 to 0 or from 0 to 1
                between k_i and k_{i-1} bits of the scalar K otherewise
               = DBL(Q[1])
    perform ADD operation on the contents of Q[0] and Q[1] and store
    result in Q[0];
    store Q[2] in Q[1];
end for; and
return Q[1- k_0].
```

The processor also may be configured to perform the following steps to implement the multiplication process KP:

```
initialize the variables Q[0], Q[1], and Q[2] to P, 2P, and P respectively;
for i = n−2 down to 0
    perform an addition operation on the contents of Q[0] and Q[1] and
    store the result in Q[0];
    perform an addition operation on the contents of Q[0] and Q[2] and
    store the results in Q[1];
end for; and
return Q[1− k₀].
```

In another general aspect, a method of encrypting a message using elliptic curve public key cryptography comprises: determining an elliptic curve; determining a base point $P=(x_B, y_B)$; embedding a message bit string into the x-coordinate of an elliptic curve point which is designated as the message point, $(x_m, y_m)$; using the private key of a sending correspondent $k_{SPr}$ and the public key of a receiving correspondent $k_{RPr}(x_b, y_b)$ to compute the scalar multiplication $(x_{bk}, y_{bk})=k_{SPr}(k_{RPr}(x_b, y_b))$ using iterative steps of point addition and doubling operations; computing a cipher point $(x_c, y_c)$ using $(x_c, y_c)=(x_m, y_m)+(x_{bk}, y_{bk})$; and transmitting appropriate bits of the x-coordinate and the sign bit of the y-coordinate of the cipher point $(x_c, y_c)$ on a medium to the receiving correspondent, wherein the scalar multiplication has no correlation between bit values of the scalar and addresses of the operands of the point addition and doubling operations used to perform the multiplication process. According to the method, the computing the scalar multiplication includes preventing power analysis attacks and address bit analysis attacks.

In yet another general aspect, a method of decrypting a message using elliptic curve public key cryptography comprises: determining an elliptic curve; determining a base point $P=(x_B, y_B)$; receiving an encrypted message including appropriate bits of an x-coordinate and a sign bit of the y-coordinate of the cipher point $(x_c, y_c)$; using the private key of a receiving correspondent, $k_{RPr}$, and the public key of a sending correspondent, $k_{SPr}(x_b, y_b)$ to compute the scalar multiplication $(x_{bk}, y_{bk})=k_{RPr}(k_{SPr}(x_b, y_b))$ using iterative steps of point addition and doubling operations; computing a message point $(x_m, y_m)$ using $(x_m, y_m)=(x_c, y_c)−(x_{bk}, y_{bk})$; and recovering a message bit string from $x_m$, wherein the scalar multiplication has no correlation between bit values of the scalar and addresses of the operands of the point addition and doubling operations used to perform the multiplication process. Other features will be apparent from the description, the drawings, and the claims.

DESCRIPTION OF DRAWINGS

FIG. 1 shows an exemplary Least-to-Most (LM) binary method for scalar multiplication.

FIG. 2 shows an exemplary Most-to-Least (ML) binary method for scalar multiplication.

FIG. 3 shows an example of the Coran's double-and-ADD always method.

FIG. 4 shows an example of Takagi's method.

FIG. 7 is an exemplary method for scalar multiplication for use in an elliptic cryptosystem.

FIG. 9 is an exemplary method for scalar multiplication for use in an elliptic cryptosystem.

Like reference symbols in the various drawings indicate like elements.

DETAILED DESCRIPTION

Figure 5:
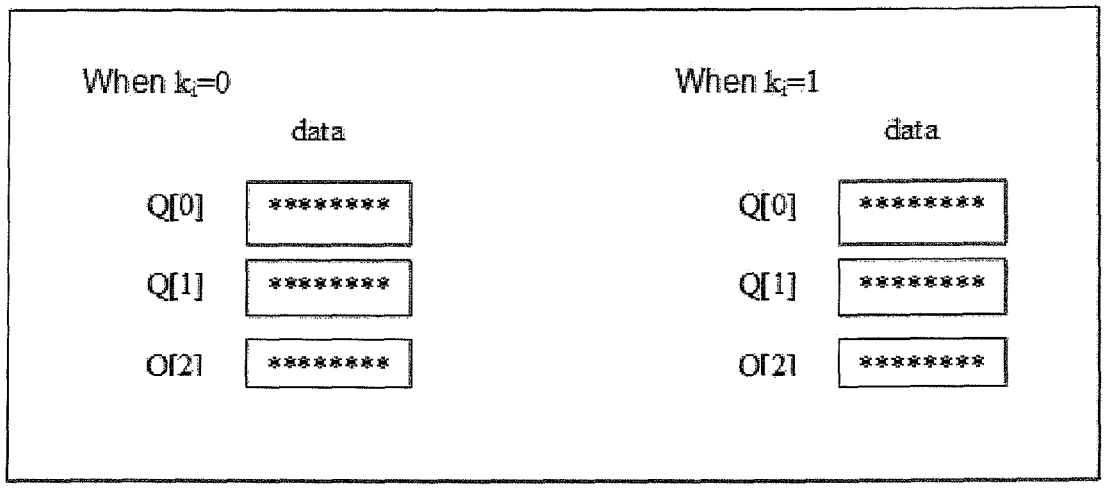
FIG. 5 illustrates an example of randomizing projective coordinates for Takagi's method.

A discrete-logarithm based crypto algorithm can be performed in any mathematical set in which certain algebraic rules hold true. In mathematical language, the set is a finite cyclic group. The discrete logarithm problem may be more difficult to solve in one group than in another for numbers of comparable size. As a result, the choice of the group is critical to the cryptographic system.

Typically, the more difficult the discrete logarithm problem is, the smaller the numbers that are used to implement the crypto algorithm. Of course, working with small numbers is easier and faster than working with large numbers. Using small numbers also results in a better performing, faster cryptographic system that requires less storage. Therefore, by carefully choosing the right group, a user may be able to work with smaller numbers, make a faster cryptographic system, and get the same, or better, cryptographic strength than a cryptographic system using larger numbers.

The groups referred to above derive from the set of finite fields. Elliptic curve cryptography is an improvement over finite-field based public-key cryptography. Methods for adapting discrete-logarithm based algorithms to the set of elliptic curves are known; however, finding discrete logarithms for elliptic curves is particularly difficult. As a result, elliptic curve-based crypto algorithms may be implemented using much smaller numbers than in the set of finite-fields of comparable cryptographic strength.

An elliptic curve group over Fields F(p), denoted as E(p), may be formed by choosing a pair of a and b coefficients, which are elements within F(p). The group consists of a finite set of points P(x,y) which satisfy the elliptic curve equation:

$$F(x,y)=y^2−x^3−ax−b=0$$

together with a point at infinity, O. The coordinates of the point x and y, are elements of F(p) represented in N-bit strings. A point is either written as a capital letter, for example, P, or as a pair in terms of the affine coordinates, that is (x,y).

An elliptic curve cryptosystem relies upon the difficulty of the elliptic curve discrete logarithm problem (ECDLP) to provide an effective cryptosystem. Using multiplicative notation, the problem can be described as: given points B and Q in the group, find a number k such that $B^k=Q$; where k is called the discrete logarithm of Q to the base B. Using additive notation, the problem becomes: given two points B and Q in the group, find a number k such that kB=Q.

In an elliptic curve cryptosystem, the large integer k is kept private and is often referred to as the secret key. The point Q together with the base point B are made public and are referred to as the public key. The security of the system relies upon the difficulty of deriving the secret k, knowing the public points B and Q. The primary factor that determines the security strength of such a system is the size of its underlying finite field. In a real cryptographic application, the underlying field is made so large that it is computationally infeasible to determine k by computing all multiples of B until Q is found.

At the core of the elliptic curve geometric arithmetic is an operation called scalar multiplication that computes kB by adding together k copies of the point B. Scalar multiplication may be performed through a combination of point-doubling and point-addition operations. The point-addition operation adds two distinct points together; the point-doubling operation adds two copies of a point together. For example, computing 11 B=(2*(2*(2B)))+3B=Q would take three point-doublings and one point-addition.

Addition of two points on an elliptic curve may be calculated as follows. A straight line drawn through two points intersects an elliptic curve at a third point. The point symmetric to the third point with respect to the x-axis is defined as a point resulting from the addition.

Doubling a point on an elliptic curve may be calculated as follows. A tangent line drawn at a point on an elliptic curve intersects the elliptic curve at another point. The point symmetric to the intersecting point with respect to the x-axis is defined as a point resulting from the doubling.

Table 1 illustrates the addition rules for adding two points $(x_1, y_1)$ and $(x_2, Y_2)$, that is, $(x_3, y_3)=(x_1, y_1)+(x_2, y_2)$

TABLE 1

| General Equations | $x_3 = m^2 - x_2 - x_1$ |
| --- | --- |
| | $y_3 = m(x_3 - x_1) + y_1$ |
| Point Addition | $m = \dfrac{y_2 - y_1}{x_2 - x_1}$ |
| Point Doubling $(x_3, y_3) = 2(x_1, y_1)$ | $m = \dfrac{3x_1^2 - a}{2y_1}$ |
| $(x_2, y_2) = -(x_1, y_1)$ | $(x_3, y_3) = (x_1, y_1) + (-(x_1, y_1)) = O$ |
| $(x_2, y_2) = O$ | $(x_3, y_3) = (x_1, y_1) + O = (x_1, y_1)$ |
| $-(x_1, y_1)$ | $= (x_1, -y_1)$ |

Given a message point $(x_m, y_m)$, a base point $(x_B, y_B)$, and a given key, k, the cipher point $(x_C, y_C)$ is obtained using the following equation:

$$(x_C, y_C) = (x_m, y_m) + k(x_B, y_B).$$

There are two basics steps in the computation of the above equations. The first step is to find the scalar multiplication of the base point with the key, "$k(x_B, y_B)$". The second adds the resulting point to the message point $(x_m, y_m)$ to obtain the cipher point.

Conversely, the message point is recovered at the receiver from the cipher point which is usually transmitted with, the shared key and the base point, that is:

$$(x_m, y_m) = (x_C, y_C) - k(x_B, y_B)$$

The steps of elliptic curve symmetric cryptography can be summarized as follows. Both the sender and receiver must agree on: random number, k, that will be the shared secret key for communication, and the base point, $P=(x_B, y_B)$. At the sending correspondent the following steps are performed:
  embed a message bit string into the x coordinate of an elliptic curve point which is designated as the message point, $(x_m, y_m)$;
  compute the cipher point $(x_c, y_c)$ is computed using, $(x_c, y_c)=(x_m, y_m)+k(x_B, y_B)$; and
  send the appropriate bits of the x-coordinate and the sign bit of the y-coordinate of the cipher point $(x_c, y_c)$ to the receiving entity.

At the receiving correspondent, the following steps are performed:
  compute the scalar multiplication $(x_{Bk}, y_{Bk})=k(x_B, y_B)$ using the shared key, k, and the base point $(x_B, y_B)$;
  compute the message point $(x_m, y_m)$ using $(x_m, y_m)=(x_c, y_c)+(-k(x_B, y_B))$; and
  recover the secret messages bit string from $x_m$.

The steps of elliptic curve public key cryptography can be summarized as follows. Both the sender and receiver must agree on an elliptic curve and a base point, $P=(x_B, y_B)$. At the sending correspondent the following steps are performed:
  embed a message bit string into the x-coordinate of an elliptic curve point designated as the message point, $(x_m, y_m)$;
  using the private key of the sending correspondent, $k_{SPr}$, and the public key of the receiving correspondent, $k_{SPr}(x_b, y_b)$, compute the scalar multiplication $(x_{bk}, y_{bk})=k_{SPr}(k_{RPr}(x_b, y_b))$;
  compute a cipher point $(x_c, y_c)$ using $(x_c, y_c)=(x_m, y_m)+(x_{bk}, y_{bk})$; and
  send appropriate bits of the x-coordinate and the sign bit of the y-coordinate of the cipher point $(x_c, y_c)$ to the receiving correspondent;

At the receiving correspondent the following steps are performed:
  using the private key of the receiving correspondent, $k_{RPr}$, and the public key of the sending correspondent, $k_{SPr}(x_b, y_b)$, compute the scalar multiplication $(x_{bk}, y_{bk})=k_{RPr}(k_{SPr}(x_b, y_b))$;
  compute the message point $(x_m, y_m)$ using $(x_m, y_m)=(x_c, y_c)=(x_{bk}, y_{bk})$; and
  recover the message bit string from $x_m$.

Scalar multiplication (SM) (or point multiplication) refers to computing the point: KP=P+P+P+ . . . P (sum taken K times) on the elliptic curve over a given finite field. The integer K is referred to as the scalar and the point P as the base point. However, adding the point P to itself K times is not an efficient way to compute scalar multiplication. More efficient methods are based on a sequence of addition (ADD) and doubling (DBL) operations. A doubling operation is simply adding the point to itself.

The computation of the point KP processed by scalar multiplication is performed using the binary expression of K represented by the equation:

$$K = k_{n-1}2^{n-1} + k_{n-2}2^{n-2} + \ldots + k_1 2 + k_0$$

where $k_i$ is the i-th bit of the binary representation of K, and n is the total number of bits.

Two primary methods of calculating KP, the Least-to-Most (LM) process and the Most-to-Least (ML) process, are shown in FIGS. 1 and 2, respectively. LM process 100 starts from the least significant bit of K; whereas, the ML process 200 starts from the most significant bit of K.

In the LM process 100, Q[0] is initialized to the identity point 0, and Q[1] to the base point P. If $k_i=1$, the elliptic curve addition ADD is performed on the points Q[0] and Q[1] in step 104 and the result is stored in the point Q[0], otherwise (i.e., for $k_i=0$) Q[0] remains unchanged. The elliptic curve doubling DBL is performed on the point Q[1] in step 106, and the result is stored in the point Q[1]. The point doubling operation of step 106 is performed in all cases regardless of the scalar bit value.

The ML process 200 treats the bit string of K starting with the most significant bit first. Since the most significant bit is always 1, the ML process starts from the next most bit, n−2, and initializes Q[0] to P. The process 200 needs only one variable, Q[0]. First, a DBL operation is performed on Q[0]

and the result is stored in Q[0] as shown in step 203. The point doubling of step 203 is performed regardless of the scalar bit value. If $k_i=1$, then a ADD operation is performed on the point Q[0] and the base point P in step 205 and the result is stored in point Q[0], otherwise (i.e., for $k_i=0$) Q[0] remains unchanged.

The difficulty in solving the elliptic curve discrete logarithm problem has been established theoretically. However, there is a possibility that information associated with secret information, such as, for example, the private key, may be determined during cryptographic processing of real applications. For example, an attack method using power analysis has been proposed that decrypts the secret information based on the information derived from the cryptographic processing.

One example of an attack method is differential power analysis (DPA) that measures changes in voltage in cryptographic processing of secret information to obtain the cryptographic process and infer the secret information on the basis of the obtained process. A DPA is disclosed in P. Kocher, J. Jaffe and B. Jun Differential Power Analysis, Advances in Cryptology: Proceedings of CRYPTO '99, LNCS 1666, Springer-Verlag, (1999) pp. 388-397.

As shown in FIG. 1, performing the ADD operation is conditioned on the value of the key bit. If the scalar bit value is ONE, an ADD operation is performed, otherwise, no ADD operation is performed. Therefore, a simple power analysis (e.g., simple side-channel analysis using power consumption as side channel) produces different power traces that distinguish if an ADD operation is performed. As a result, bit values of the scalar may be revealed.

As shown in FIG. 3, one widely used approach to prevent this kind of leak is the Double-and-ADD always process 300 by J. Coron described in, "Resistance against Differential Power Analysis for Elliptic Curve Cryptosystems", Cryptographic Hardware and Embedded Systems: Proceedings of CHES '99, LNCS 1717, Springer-Verlag, (1999) pp. 292-302. The double-and-ADD always process 300 performs a dummy addition in the ML method when the processed bit is '0' so that each iteration of the algorithm appears to be a doubling operation followed by an addition operation.

As shown in FIG. 4, another ML process 400 proposed by Takagi to prevent leaking of information by power analysis is disclosed in U.S. Pat. No. US 2003/0123656, entitled "ELLIPTIC CURVE CHRYPTOSYSTEM APPARATUS, STORAGE MEDIUM STORING ELLIPTIC CURVE CRYPTOSYSTEM PROGRAM, AND ELLIPTIC CURVE CRYPTOSYSTEM ARITHMATEC METHOD." Takagi's process uses extra ADD operations to assure that the sequence of DBL and ADD operations is carried out in each iteration.

Even if an algorithm is protected against single power analysis, the algorithm may still be vulnerable to more sophisticated DPAs. For example, assume that the double-and-add always method is implemented with one of the previous algorithms shown in FIG. 1 or 2. The scalar value K in binary may be represented as:

$K = k_{n-1}2^{n-1} + k_{n-2}2^{n-2} + \ldots + k_1 2 + k_0$ where $k_i$ is the i-th bit of the binary representation of K, and n is the total number of bits. DPA is based on the assumption that an attacker knows the highest bits, $k_{n-1}, k_{n-2} \ldots k_{j+1}$, of K. Then, the next bit $k_j$ is presumed to equal '1', and several points $P_1, \ldots, P_t$ are randomly chosen to compute:

$$Q_r = \left( \sum_{i=j}^{n-1} k_i 2^{i-j} \right) P_r \text{ for } 1 \ r \ t.$$

Based on statistical information of these points (i.e., $Q_r$, 1 r t), it may be determined whether the assumption is correct or not. Once $k_j$ is known, the remaining bits, $k_{j-1}, k_{j-2} \ldots k_0$, are recovered recursively, in the same way.

J. Coron, "Resistance against Differential Power Analysis for Elliptic Curve Cryptosystems", Cryptographic Hardware and Embedded Systems: Proceedings of CHES '99, LNCS 1717, Springer-Verlag, (1999) pp. 292-302, describes the following randomization-based countermeasures to be effective against DPA attacks:

- randomizing the base-point P by computing Q=kP as Q=(P+R)−kR for a random point R;
- using randomized projective coordinates for a random number r≠0, the projective coordinates, (X, Y, Z) and (rX, rY, rZ) represent the same point, so for a random number r, if P=(x0, y0), Q is computed as Q=k(rx0, ry0,:r); and
- randomizing the scalar K if $n=\text{ord}_E(P)$ denotes the order of P ∈ E(F(p)), then Q is computed as Q=(k+r n)P for a random r; (alternatively, one can replace n by the order of the elliptic curve, #E(F(p))).

These countermeasures may be used with Coron's algorithm or Takagi's processes to protect the scalar multiplication computation against both simple power attacks and DPA attacks.

The concept of an address-bit analysis (ABA) attack is disclosed in Kouichi Itoh, Tetsuya Izu, and Masahiko Takenaka in "Address-Bit Differential Power Analysis of Cryptographic Schemes OK-ECDH and OK-ECDSA", Cryptographic Hardware and Embedded Systems: Proceedings of CHES '2002, LNCS 2523, Springer-Verlag, (2002) pp. 129-143. The ABA attack is based on the correlation between bit values of the scalar and the location (i.e., address) of the variables used in a scalar multiplication process. As a result, the countermeasures using randomization of the base point or the projective coordinate which protect against simple power analysis and DPA do not provide a countermeasure against ABA attacks. Although, the randomization processes remove the correlation between the values of the variables used in a scalar multiplication process and the bits of the scalar, K; these countermeasures do not remove the correlation between the bit values of a scalar and the location of the variables used in a scalar multiplication process.

Figure 6:
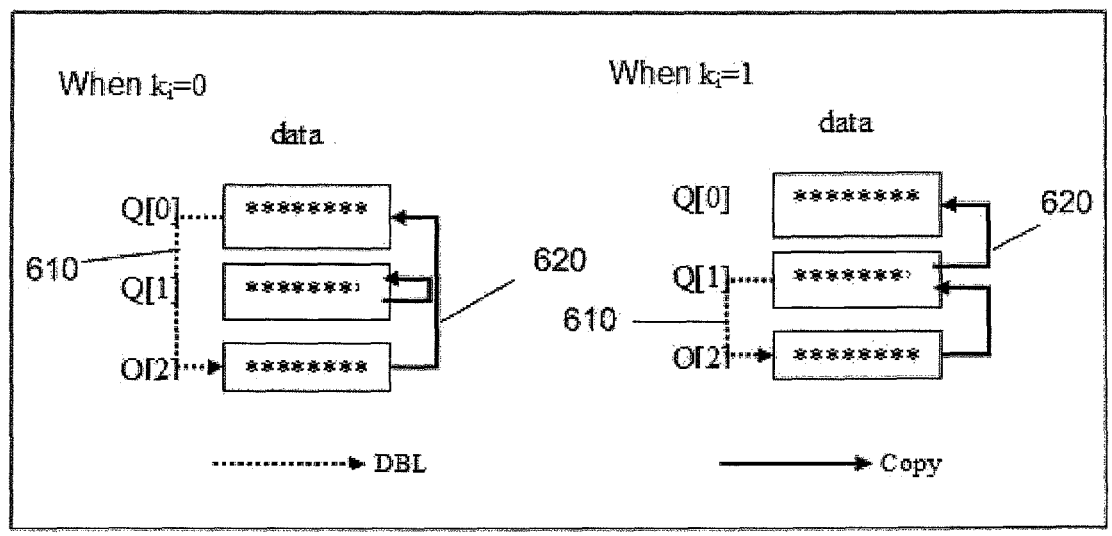
FIG. 6 illustrates an ABA attack on the method of FIG. 5.

For example, consider Takagi's process. The variables' values can be randomized by randomizing the projective coordinates (or the base point) as shown in FIG. 5. However, FIG. 6 shows that the location of the input operand of the DBL operation 610 and the data transfer from either Q[1] or Q[2] to Q[0] 620 are correlated to the bit value of the scalar. FIG. 6 (and also steps 5 and 6 in FIG. 4) shows that in Takagi's algorithm the following data transfer is performed based on the bit value of the scalar:

$$Q[0] = \begin{Bmatrix} Q[2] & k_i = 0 \\ Q[1] & k_i = 1 \end{Bmatrix}$$

$$Q[1] = \begin{Bmatrix} Q[1] & k_i = 0 \\ Q[2] & k_i = 1 \end{Bmatrix}$$

A similar correlation exits in Coron's process in step 305 where Q[2] is loaded by either Q[0] or Q[1] based on the bit value of the scalar. Any process where the location of the input operands or the location of the result is dependent on the scalar bit values is vulnerable to ABA attacks. Therefore, randomizing the base point or the projective coordinates as a countermeasure does not prevent the attack because the locations of the input and/or output operands are correlated to the scalar bits.

Randomizing the scalar value also is vulnerable to ABA attacks. It may be presumed that leaking information about the bit values of the randomized scalar and recovering the bit values of the randomized scalar is acceptable since they do not represent the bit values of the actual scalar. However, the attacker may recover the correct bit values of the actual scalar from the recovered bits of the randomized scalar as well as knowledge about the scalar randomization algorithm (which is usually based on redundant modulo representation).

Scaler multiplication (SM) is a primary component of elliptical curve crypto systems (ECCs). ECCs need to determine the multiplication KP from a base point and a scalar integer (K). However, securing SM against side channel attacks (e.g., SPA and DPA) does not necessarily provide any protection against ABA attacks. The following description provides a number of processes that provide countermeasures against SPA, DPA and ABA attacks.

The following description is directed to a ML process that is resistant to various attacks. According to this process, in any iteration of the addition (ADD) and double (DBL) operations are performed in a fixed sequence, denoted as ADD→DBL. In other words, ADD and DBL operations are performed in all iterations in the same order independent of the bit values of a scalar. For example, the scalar value K may be represented in binary as:

$$K = k_{n-1} 2^{n-1} + k_{n-2} 2^{n-2} + \ldots + k_1 2 + k_0$$

where $k_i$ is the i-th bit of the binary representation of K, and n is the total number of bits. The exemplary process 700 is shown in FIG. 7. The process 700 provided with the inputs K and P and determines the SM of KP as the output. The process includes three variables, Q[0], Q[1], and Q[2]. The six steps are illustrated in FIG. 7.

First the variables Q[0] and Q[1] are initialized to P and 2P, respectively. Next an iteration loop is performed for: $=n-2$ down to 0. The loop performs the following steps. First, the choice of the value to be copied to Q[2] in step 703 is based on existence of a transition between $k_i$ and $k_{i-1}$ bits of the scalar. If there is a transition from 0 to 1 or from 1 to 0 between bits $k_i$ and $k_{i-1}$, Q[0] is copied to Q[2]; otherwise (i.e., $k_i$ and $k_{i-1}$ are both 1's or are both 0's and there is no transition) Q[1] is copied to Q[2]. Next, the contents of Q[0] and Q[1] are added, and the result is stored in Q[0]; then the DBL operation is performed on the contents of Q[2] and the result is stored in Q[1].

The following tables provide two examples of the process 700. Table 2 shows the values of Q[0], Q[1], and Q[2] in all iterations of calculating 173P. Table 3 shows all iterations of calculating 155P.

TABLE 2

| | K | | | | | | | |
|---|---|---|---|---|---|---|---|---|
| | 1 | 0 | 1 | 0 | 1 | 1 | 0 | 1 |
| Q[2] | | 1 | 3 | 5 | 11 | 22 | 43 | 87 |
| Q[0] | 1 | 3 | 5 | 11 | 21 | 43 | 87 | 173 |
| Q[1] | 2 | 2 | 6 | 10 | 22 | 44 | 86 | 174 |

TABLE 3

| | K | | | | | | | |
|---|---|---|---|---|---|---|---|---|
| | 1 | 0 | 0 | 1 | 1 | 0 | 1 | 1 |
| Q[2] | | 1 | 2 | 5 | 10 | 19 | 39 | 78 |
| Q[0] | 1 | 3 | 5 | 9 | 19 | 39 | 77 | 155 |
| Q[1] | 2 | 2 | 4 | 10 | 20 | 38 | 78 | 156 |

According to the process 700, the input operands of the ADD operation are always Q[0] and Q[1] regardless of the bit values of the scalar K. The result of the ADD operation is always Q[0] regardless of the bit values of the scalar K. The operand of a DBL operation is always Q[2] regardless of the bit values of the scalar K. The result of the DBL operation is stored in Q[1] regardless of the bit values of the scalar K.

The load operation for Q[2] is based on the existence of a transition between the current bit and the previous one as described in step 703. Assuming that the value of the previous bit is not known, this property can be exploited as a powerful countermeasure for ABA since it is difficult for an attacker to detect whether this transition is from 0 to 1 or from 1 to 0. As a result, the attacker is unable to determine whether the previous bit was 1 and changed to 0, or the previous bit was 0 and changed to 1. The same argument holds in the absence of the transition. For example, the attacker is unable to determine whether the previous bit was 1 and remains 1 or was 0 and remains 0. The only exception to this is the first iteration, since the most significant bit of the key, $k_{n-1}$, is always 1. Therefore an attacker can find the value of the bit $k_{n-2}$ depending on whether content of Q[2] is loaded from Q[1] or Q[0] as stated in step 703 of the process. One countermeasure against such a possible leak of information is described below.

The process 700 also provides a countermeasure against DPA since the choice of whether Q[0] or Q[1] is loaded into Q[2] depends on the transition in the value of the bits of the scalar rather than depending directly on the value of individual bits. Using this process the following are totally independent of the scalar bit values:

ADD and DBL operations since they occur during each iteration;

the locations of the input operands of an ADD operation;

the location of the output operand of an ADD operation;

the location of the input operand of a DBL operation; and the location of the output operand of a DBL operation.

Figure 8:
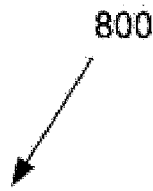
FIG. 8 is an exemplary method for scalar multiplication for use in an elliptic cryptosystem.

FIG. 8 shows another ML process 800 that provides countermeasures to ABA. According to the process 800, in any iteration of a scalar multiplication the double (DBL) and addition (ADD) operations are performed in a fixed sequence, denoted as DBL→ADD. In other words, the DBL and ADD operations are performed in all iterations in the same order independently of the bit values of a scalar. The scalar value K may be represented in binary as:

$$K = k_{n-1} 2^{n-1} + k_{n-2} 2^{n-2} + \ldots k_1 2 + k_0$$

where $k_i$ is the i-th bit of the binary representation of K, and n is the total number of bits. The process 800 includes three variables, Q[0], Q[1], and Q[2]. Using this process all the following are totally independent of the scalar bit values:

ADD and DBL operations since they occur at each iteration;

the locations of the input operands of an ADD operation;

the location of the output operand of an ADD operation; and the location of the output operand of a DBL operation.

According to the process 800 the variables Q[0] and Q[1] to P and 2P are initialized, respectively. An iteration loop for 1=n−2 down to 0 is performed for the following steps. The input operand of DBL operation in step 803 may be chosen based on the existence of a transition between $k_i$ and $k_{i-1}$ bits of the scalar. If there is a transition from 0 to 1 or from 1 to 0 between bits $k_i$ and $k_{i-1}$, Q[0] is doubled and the result is stored in Q[2]; otherwise (i.e., $k_i$ and $k_{i-1}$ are both 1's or are both 0's and there is no transition) Q[1] is doubled and the result is stored in Q[2]. The ADD operation is performed on the contents of Q[0] and Q[1]. The result is stored in Q[0].

The following tables present two examples of the process 800 shown in FIG. 8. Table 4 shows the values of Q[0], Q[1], and Q[2] in all iterations of calculating 173P. Table 5 shows all iterations of calculating 155P.

TABLE 4

| | K | | | | | | | |
|---|---|---|---|---|---|---|---|---|
| | 1 | 0 | 1 | 0 | 1 | 1 | 0 | 1 |
| Q[2] | | 2 | 6 | 10 | 22 | 44 | 86 | 174 |
| Q[0] | 1 | 3 | 5 | 11 | 21 | 43 | 87 | 173 |
| Q[1] | 2 | 2 | 6 | 10 | 22 | 44 | 86 | 174 |

TABLE 5

| | K | | | | | | | |
|---|---|---|---|---|---|---|---|---|
| | 1 | 0 | 0 | 1 | 1 | 0 | 1 | 1 |
| Q[2] | | 2 | 4 | 10 | 20 | 38 | 78 | 156 |
| Q[0] | 1 | 3 | 5 | 9 | 19 | 39 | 77 | 155 |
| Q[1] | 2 | 2 | 4 | 10 | 20 | 38 | 78 | 156 |

According to the process 800, the operands of ADD operation are always Q[0] and Q[1] regardless of the bit values of the scalar K. The result of an ADD operation is always Q[0] regardless of the bit values of the scalar K. The result of a DBL operation is stored in Q[2] and then transferred to Q[1] regardless of the bits of the scalar K.

The operand of the doubling operation is based on the existence of a transition between the current bit and the previous one as stated in step 803 of the process. Assuming that the value of the previous bit is not known, this property can be exploited as a powerful countermeasure for ABA attacks since it is difficult for the attacker to detect whether the transition is from 0 to 1 or from 1 to 0. As a result, the attacker cannot know whether the previous bit was a 1 and changed to a 0, or the previous bit was a 0 and changed to a 1. The same holds in the absence of the transition. For example, the attacker is unable to determine whether the previous bit was 1 and remains 1 or was 0 and remains 0. The only exception to this is the first iteration, since the most significant bit of the key, $k_{n-1}$, is always 1. Therefore an attacker may find the value of the bit $k_{n-2}$ depending on whether the operand of the DBL operation is Q[1] or Q[0] as stated in step 803 of the process. A countermeasure against such a possible leak of information is described below.

In addition, the data transfer from Q[2] to Q[1] is performed in all cases regardless of the bit of a scalar K. This process also provides a countermeasure against DPA attacks since the choice of whether to double Q[0] or Q[1] depends on the transition in the value of the bits of the scalar rather than depending directly on the value of individual bits.

Besides the ability to work separately, random switching between the previously described processes 700 and 800 may be performed at any iteration based on the value of an additional bit. For example, if the value of this bit is changed at random, the switching between the two processes may take place at random. The overhead cost of switching between processes 700 and 800 is simply the cost of generating a random binary sequence. Furthermore, the switching between one process to the next does not require any additional cycles and can take place from one iteration to the next in a seamless fashion.

Tables 6 and 7 present two examples of switching between processes 700 and 800. Table 6 illustrates switching from the process 700 of FIG. 7 to the process 800 of FIG. 8. For example, suppose that the switching is decided (randomly as discussed above) to be after the third iteration as indicated by the bold numbers in the Table 6. Up to the third iteration, the first process 700 is used and the values of Q[0] and [1] are computed based on the ADD→DBL sequence. Beginning with fourth iteration, the second process 800 is used and continues calculating the correct values for the remaining iterations using the DBL→ADD sequence of operations. Table 7 shows a similar example starting with the second process 800 and switching to first process 700 after the third iteration.

TABLE 6

| | Iteration | | | | | | | |
|---|---|---|---|---|---|---|---|---|
| | 0 | 1 | 2 | 3 | 4 | 5 | 6 | 7 |
| K | 1 | 0 | 1 | 0 | 1 | 1 | 0 | 1 |
| Q[2] | | 1 | 3 | 10 | 22 | 44 | 86 | 174 |
| Q[0] | 1 | 3 | 5 | 11 | 21 | 43 | 87 | 173 |
| Q[1] | 2 | 2 | 6 | 10 | 22 | 44 | 86 | 174 |

TABLE 7

| | Iteration | | | | | | | |
|---|---|---|---|---|---|---|---|---|
| | 0 | 1 | 2 | 3 | 4 | 5 | 6 | 7 |
| K | 1 | 0 | 0 | 1 | 1 | 0 | 1 | 1 |
| Q[2] | | 2 | 4 | 5 | 10 | 19 | 39 | 78 |
| Q[0] | 1 | 3 | 5 | 9 | 19 | 39 | 77 | 155 |
| Q[1] | 2 | 2 | 4 | 10 | 20 | 38 | 78 | 156 |

FIG. 9 shows a third ML process 900 performs one ADD operation followed by another ADD operation in each iteration of a SM. In any iteration of the SM, the first ADD and the second ADD operations are performed in a fixed sequence (ADD→ADD) (i.e., they are performed in all iterations in the same order independently of the scalar bit values). Since P may be determined by negating the y-coordinate of P, the ADD operation may be used to add or subtract P. The scalar value K may be represented in binary as:

$$K = k_{n-1}2^{n-1} + k_{n-2}2^{n-2} + \ldots + k_1 2 + k_0$$

where $k_i$ is the i-th bit of the binary representation of K, and n is the total number of bits. The process 900 uses three variables, Q[0], Q[1], and Q[2].

According to the process 900, all the following are totally independent of the scalar bit values:
the first ADD and the second ADD operations since they occur at each iteration;
the locations of the input operands of the first ADD operation;
the location of the output operand of the first ADD operation;

the locations of the input operands of the second ADD operation; and the location of the output operand of the second ADD operation.

The second ADD operation performs the addition operation on the contents of Q[0] and Q[2]. The result is stored in Q[1]. The effect of $(-1)^{1-ki}$ in step 904 of the process is explained as follows. First, note that the content of Q[2] is always P. If the current bit $k_i$ is 1, P will be added to Q[0]; otherwise, (i.e., for $k_i$=0), −P is added to Q[0]. The point −P is obtained simply by negating the y-coordinate of P According to the process 900 the variables Q[0], Q[1], and Q[2] to P, 2P, and P are initialized, respectively. Next, an iteration loop for i=n−2 down to 0 is performed for the following steps. A first ADD performs the addition operation on the contents of Q[0] and Q[1]. The result is stored in Q[0]. A second ADD performs the addition operation on the contents of Q[0] and Q[2]. The result is stored in Q[1]. Therefore, the content of Q[2] is always P. If the current bit is 1, P will be added to Q[0]; otherwise, −P is added to Q[0].

Tables 8 and 9 present two examples of the process 900. Table 8 shows the values of Q[0], Q[1], and Q[2] in all iterations of calculating 173P. Table 9 shows all iterations of calculating 155P.

TABLE 8

| | K | | | | | | | |
|---|---|---|---|---|---|---|---|---|
| | 1 | 0 | 1 | 0 | 1 | 1 | 0 | 1 |
| Q[2] | 1 | 1 | 1 | 1 | 1 | 1 | 1 | 1 |
| Q[0] | 1 | 3 | 5 | 11 | 21 | 43 | 87 | 173 |
| Q[1] | 2 | 2 | 6 | 10 | 22 | 44 | 86 | 174 |

TABLE 9

| | K | | | | | | | |
|---|---|---|---|---|---|---|---|---|
| | 1 | 0 | 0 | 1 | 1 | 0 | 1 | 1 |
| Q[2] | 1 | 1 | 1 | 1 | 1 | 1 | 1 | 1 |
| Q[0] | 1 | 3 | 5 | 9 | 19 | 39 | 77 | 155 |
| Q[1] | 2 | 2 | 4 | 10 | 20 | 38 | 78 | 156 |

The process 900 works independently of the locations of the initial points P and 2P. The operands of the first ADD operation are always Q[0] and Q[1] regardless of the bit values of a scalar K. The result of the first ADD operation is stored in Q[0] regardless of the is 5 bit values of a scalar K. The operands of the second ADD operation are always Q[0] and Q[2] independently of the bit values of a scalar K. The result of the second ADD operation is stored in Q[1] regardless of the bit values of a scalar K. The contents of Q[2] is always P. If the current bit is 1, P is added to Q[0] in the second ADD operation; otherwise, −P is added to Q[0] in the second ADD operation. The point −P can be calculated on the fly and costs nothing since it is only negating the y-coordinate of P. The source and destinations operands of the second ADD are fixed whether it performs ADD(Q[0],P) or ADD(Q[0],−P).

According to the process 900, even though the value of the most significant bit, $k_{n-1}$, is known to be 1, an attacker cannot detect the value of the next most significant bit, $k_{n-2}$, since the initial step is independent of the location of the points P and 2P. In other words, the process 900 is not vulnerable to an ABA attacks even at the first iteration.

Each of the processes 700, 800, and 900 described above may be combined to form a combined countermeasure for the following three attacks at the same time: SPA, DPA, and ABA. For example, a countermeasure to these attacks may be form by combining the first process 700 and third process 900.

As stated above, a property of the first process is that the first iteration may be vulnerable to ABA attacks since the most significant bit of the key, $k_{n-1}$, is always known to be 1. For example, an attacker may be able to determine the value of the bit $k_{n-2}$ depending on whether the content of Q[2] is loaded from Q[1] or Q[0] as stated in step 703 of the first process. To overcome this potential weakness, the third process 900 may be use to perform the initial iteration since its initial step is independent of the content of Q[0] and Q[1] which could be either the points P and 2P or 2P and P respectively. In other words, by using the third process 900 for the first iteration, an attacker is not able to detect the value of the next most significant bit, $k_{n-2}$, even though the value of the most significant bit, $k_{n-1}$, is always known to be 1. As a result, this property of the third process 900 maybe used to overcome any possible leaking of information about $k_{n-2}$ in the first iteration of the first process 700. This combination of the first and third process is used to prevent any leakage of information about $k_{n-2}$. Once the value of $k_{n-2}$ is protected against an ABA attack in the first iteration, the first process 700 may be used in subsequent iterations.

The combination of the first and third processes can be summarized as follows. Q[0] and Q[1] can be randomly initialized to either P and 2P or 2P and P, respectively. This is an important step because it provides a countermeasure against any expected initialization by the attacker. This randomization may be done at the beginning of each scalar multiplication process. The third process may be used in the first iteration (i.e., $k_{n-2}$) since it calculates the correct value regardless of the locations of the initial values. The first process is then applied in the subsequent iterations to process the remaining bits of the scalar.

By combining the first and third processes, a countermeasure against SPA attacks is provided since the same sequence of operations ADD→ADD and ADD→DBL are independent of the bits of the scalar. In addition, a countermeasure against DPA attacks is provided by use of the first process because the choice of whether Q[0] or Q[1] is loaded into Q[2] depends on the transition in the value of the bits of the scalar (and not directly on the value of individual bits). During the third process, which is used in the first iteration, the choice as to whether Q[0] and Q[1] could be P and 2P or 2P and P, respectively, may be made at random. The location of the input operand of each operation and the location of the result of each operation are independent of the bits of the scalar. Finally, randomization of the scalar K and/or the projective coordinates of the base and intermediate points also may be used in the combination of the first and third processes to increase its strength against DPA attacks.

As described above, the first iteration of the second process 800 may be vulnerable to ABA attacks since the most significant bit of the key, $k_{n-1}$, is always known to be 1. In this case, an attacker may determine the value of the bit $k_{n-2}$ depending on whether the input operand of DBL operation is Q[1] or Q[0] as stated in step 803 of the second process 800. To overcome this potential weakness, the third process 900 may be used to perform the initial iteration since its initial step is independent of the content of Q[0] and Q[1] which could be either the points P and 2P or 2P and P, respectively. In other words, by using the third process 900 for the first iteration, an attacker is not able to detect the value of the next most significant bit, $k_{n-2}$, even though the value of the most significant bit, $k_{n-1}$, is always known to be 1. As a result, this property of the third process 900 maybe used to overcome the possible leaking of information about $k_{n-2}$ in the first iteration of the second process 800. The combination of the second and third processes is used to prevent any leakage of information about $k_{n-2}$. Once the value of $k_{n-2}$ is protected against ABA attacks during the first iteration, the second process 800 may be used in subsequent iterations.

The combination of the second and third processes may be summarized as follows. Q[0] and Q[1] may be randomly initialized to either P and 2P or 2P and P, respectively. This is an important step because it provides a countermeasure against any expected initialization by the attacker. This randomization may be done at the beginning of each scalar multiplication process. The third process 900 may be used in the first iteration (i.e., $k_{n-2}$) since the first iteration calculates the correct value regardless of the locations of the initial values. The second process 800 maybe applied in the subsequent iterations to process the remaining bits of the scalar.

A countermeasure against SPA attacks is provided by combining the second and third processes since the same sequence of operations ADD→ADD and DBL→ADD are independent of the bits of the scalar. In addition, a countermeasure against DPA attacks is provided since the choice in the second process 800 of whether Q[0] or Q[1] is doubled and the result is stored in Q[2] depends on the transition in the value of the bits of the scalar (and not directly on the value of individual bits). During the third process 900, which is used in the first iteration, the choice as to whether Q[0] and Q[1] are P and 2P or 2P and P, respectively, may be made at random. The location of the input operand of each operation and the location of the result of each operation are independent of the bits of the scalar. Finally, randomization of the scalar K and/or the projective coordinates of the base and intermediate points also may be used in the combination of the second and third processes to increase its strength against DPA attacks.

As stated above, the first iteration of the first and second processes may be vulnerable to ABA attacks since the most significant bit of the key, $k_{n-1}$, is always known to be 1. In case of the first process 700, an attacker can find the value of the bit $k_{n-2}$ depending on whether the content of Q[2] is loaded from Q[1] or Q[0] as stated in step 3. In the second process 800, an attacker can find the value of the bit $k_{n-2}$ depending on whether the input operand of DBL operation is Q[1] or Q[0] as stated in step 3. To overcome these potential weaknesses, as pointed out above, the third process may be used to perform the initial iteration of any SM since its initial step is independent of the content of Q[0] and Q[1] which may be either the points P and 2P or 2P and P, respectively. In other words, when using the third process 900 in the first iteration of an SM, an attacker is not able to detect the value of the next most significant bit, $k_{n-2}$, even though the value of the most significant bit, $k_{n-1}$, is always known to be 1. As a result, the third process 900 may be used to overcome the possible leaking of information about $k_{n-2}$ in the first iteration of the first and second processes. The combination of the third process 900 with one of the first and second processes is used to prevent any leakage of information about $k_{n-2}$. Once the value of $k_{n-2}$ in the first iteration is protected against ABA attacks either of the first or second processes maybe selected at random to be used in subsequent iterations. However, if desired, random switching between the first and second processes is possible at any iteration (after $k_{n-2}$) based on the value of an additional bit. For example, if the value of this bit is changed at random, the switching between the processes may take place at random starting from the iteration where the additional bit value is changed.

The combination of the first, second, and third processes may be summarized as follows. Q[0] and Q[1] can be randomly initialized to either P and 2P or 2P and P, respectively, to provide countermeasure against any expected initialization by the attacker. This randomization may be done at the beginning of each scalar multiplication process. The third process 900 maybe used in the first iteration (i.e. $k_{n-2}$) since it calculates the correct value regardless of the locations of the initial values. Either the first or second process may be used after the first iteration. Random switching between the first and second processes may be applied at any iteration in subsequent iterations to process the remaining bits of the scalar. This random switching is based on the value of an additional bit. If the value of this bit is changed at random, the switching between the two processes may take place at random.

Combining the first, second, and third processes provides a countermeasure against SPA attacks since the same sequence of operations ADD→ADD, ADD→DBL, and DBL→ADD are independent of the bits of the scalar. In addition a countermeasure against DPA attacks is provided since the choice of whether Q[0] or Q[1] is loaded into Q[2] in the first process depends on the transition in the value of the bits of the scalar rather than depending directly on the value of individual bits; the choice of whether Q[0] or Q[1] is doubled in the second process depends on the transition in the value of the bits of the scalar rather than depending directly on the value of individual bits; and the third process which is used in the first iteration, the choice as to whether Q[0] and Q[1] could be P and 2P or 2P and P, respectively, can be made at random. The location of the input operand of each operation in all of the three algorithms and the location of the result of each operation are independent of the bits of the scalar. Finally, randomization of the scalar K and/or the projective coordinates of the base and intermediate points also may be used in the combination of the first, second, and third processes to increase its strength against DPA.

Figure 10:
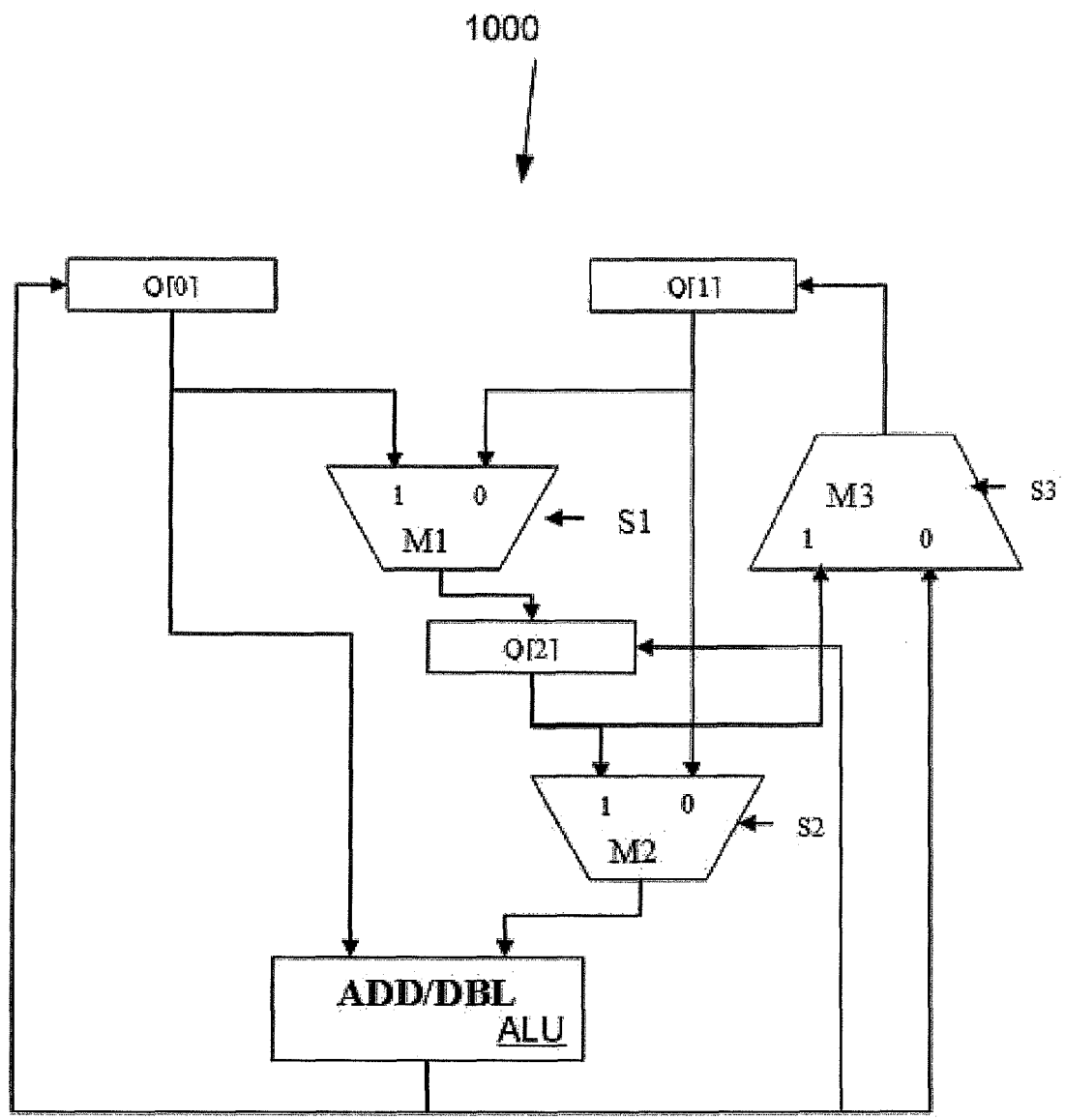
FIG. 10 is an exemplary block diagram of a processing unit for sequential processing of the methods of FIGS. 8, 9, and 10.

FIG. 10 shows one example of a processing unit 1000 that may be used when the ADD and DBL operations of the first, second, and third processes are performed in a sequential manner. The processing unit may be used to implement the first, second, or third process or the various combinations of these processes described above.

The processing unit 1000 includes three registers (e.g., Q(0), Q(1), and Q(2)), three multiplexers (e.g., M1, M2, and M3) and one arithmetic logic unit (ALU). Each multiplexer includes a select line S1, S2, and S3, respectively; the use of each is described for each of the processes below.

The following descriptions show how the processing unit is used to implement each process. However, the same implementation of each process may be used for the combination of the first, second, and third processes as described.

It should be noted that in a particular implementation of the first and second processes shown in FIG. 10 that the first cycle in both processes is used to load register Q[2] from either Q[0] or Q[1]. During the loading cycle in both processes, a dummy computation is carried out by the ALU such as one field multiplication/addition where the operands of the dummy computation are the contents of Q[0] and Q[1]. In both processes, the result of this computation is discarded. Hence during this cycle, both registers are being accessed. Consequently, the additional power of loading one of these operands into Q[2] is masked by the power consumed in accessing both registers by the ALU and carrying out the dummy arithmetic operation. Therefore, it is very difficult for an attacker to infer whether the content of Q[0] or Q[1] is being loaded into Q[2], and hence it will be difficult to identify whether the step involves a transition or no transition.

It should also be noted that the combined implementation shown in FIG. 10 would require one additional cycle for the second process 800. The additional cycle overhead for the second process 800 is not significant to the total number of cycles needed to perform each iteration of the process since point addition and point doubling require many modulo multiplication and addition operations which in turn require many cycles. Hence the added overhead of a single cycle for loading register Q[2] in the second process 800 is in fact not significant.

The first process 700 may be implemented using the components shown in FIG. 10 as follows. First Registers Q[0] and Q[1] are initialized to P and 2P, respectively. The control selection line, S1, is used to load register Q[2] with either the content of register Q[0] or the content of register Q[1] based on the Boolean function: $S1=k_i \oplus k_{i-1}$. In other words, if there is a transition between $k_i$ and $k_{i-1}$, the bits of the scalar K, S1=1 and Q[2]=Q[0]; otherwise, (S1=0) and Q[2]=Q[1]. Control selection line, S2, is used to pass the content of register Q[1] as the second input operand in case of an ADD operation, or pass the content of register Q[2] as an input operand to a DBL operation. In other words, S2=0 when an ADD operation needs to be performed, and S2=1 when a DBL operation needs to be performed. Note that the control line S2 is independent of the scalar bit values. Control selection line, S3, is used to select the result of DBL operation to be stored in Q[1].

The second process 800 uses the same components and the same control lines as described above for the first process. The only difference between the processes is that the DBL operation is performed first. The second process 800 may be implemented using the components shown in FIG. 10 as follows. First, registers Q[0] and Q[1] are initialized to P and 2P, respectively. The control selection line, S1, is used to load register Q[2] with either the content of register Q[0] or the content of register Q[1] based on the Boolean function: $S1=k_i \oplus k_{i-1}$. In other words, if there is a transition between $k_i$ and $k_{i-1}$ bits of the scalar K, S1=1) and Q[2]=Q[0]; otherwise, S1=0 and Q[2]=Q[1]. The control selection line, S2, is used to pass the content of register Q[1] as the second input operand when there is an ADD operation, or to pass the content of register Q[2] as an input operand to the DBL operation. In other words, S2=0 when an ADD operation needs to be performed and S2=1 when a DBL operation needs to be performed. Note that this control line S2 is independent of the scalar bit values. Control selection line, S3, is used to select the contents of Q[2] to be transferred to Q[1].

The third process 900 may be implemented using the components shown in FIG. 10 as follows. First, registers Q[0] and Q[1] are randomly initialized to (P and 2P) or (2P and P), respectively. Register Q[2] is initialized to P. Control selection line, S1, is not used and register Q[2] has a fixed value=P in all iterations. Control selection line, S2, is used to pass the content of register Q[1] as the second input operand to the first ADD operation, or pass Q[2] as the second input operand in case of the second ADD operation. In other words, S2=0 if the first ADD operation needs to be performed, and S2=1 when the second ADD operation needs to be performed. Note that the control line S2 is independent of the scalar bit values. In addition, the first input operand for both first and second ADD operations is fixed to Q[0]. Control selection line, S3, is used to select the result of the second ADD operation to be stored in Q[1].

The function of selection lines under the three processes 700, 800, and 900 are summarized in Table 10.

TABLE 10

| Selection Line | Function in case of first process 700 | Function in case of second process 800 | Function in case of third process 900 |
|---|---|---|---|
| S1 | Selects Q[0] when there is a transition or Q[1] when no transition | Selects Q[0] when there is a transition or Q[1] when no transition | Not used |
| S2 | Selects Q[1] when performing an ADD operation, or Q[2] when performing a DBL operation | Selects Q[1] when performing an ADD operation, or Q[2] when performing a DBL operation | Selects Q[1] when performing the first ADD operation, or Q[2] when performing the second ADD operation |
| S3 | Selects the result of DBL operation | Selects Q[2] to be loaded in Q[1] (step 805). | Selects the result of the second ADD |

Figure 11:
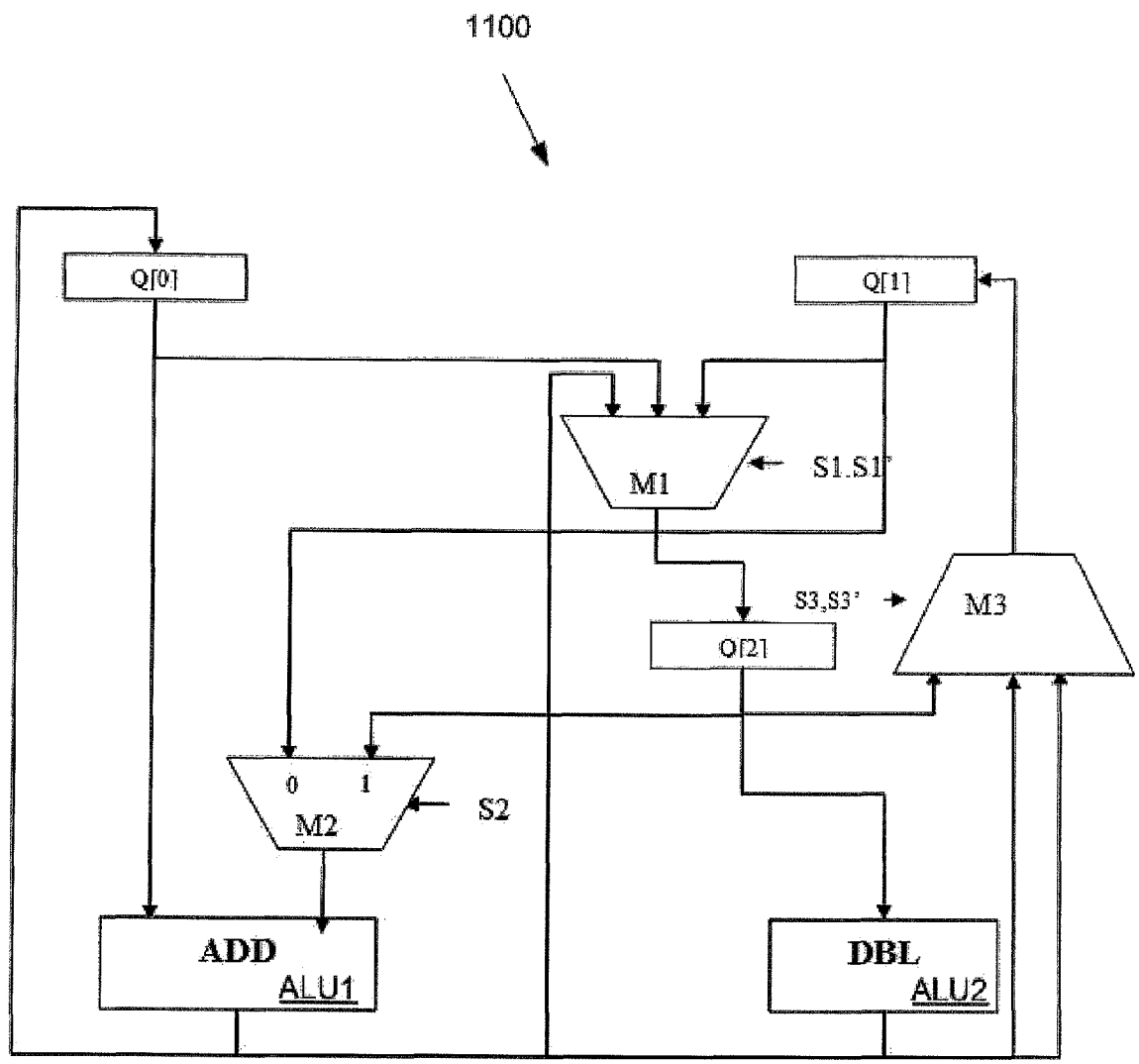
FIG. 11 is an exemplary block diagram of processing unit for parallel processing of the methods of FIGS. 8, 9, and 10.

FIG. 11 shows a processing unit 1100 used when the ADD and DBL operations of the first, second, and third processes are performed by using two arithmetic processing units (ALU1 and ALU2) in a parallel. According to this implementation, ALU1 is dedicated to the addition operation and ALU2 is dedicated to the doubling operation. The parallel implementation may be used for the first, second, or third process or the various combinations of processes described above. The following descriptions show how the processing unit 1100 is used to implement each process. However, the same implementation of each process may be used for the possible combination of the first, second, and/or third processes described.

In a similar fashion to the sequential implementation shown in FIG. 11, it should be noted that in the particular implementation of the first and second processes using the processing unit shown in FIG. 11, the first cycle in both processes is used to load register Q[2] from either Q[0] or Q[1]. During the loading cycle in both processes, a dummy computation is carried out by the unit such as one field multiplication/addition where the operands of this dummy computation are the contents of Q[0] and Q[1]. In both processes, the result of the computation is discarded. Hence during this cycle, both registers are being accessed. Consequently, the additional power of loading one of these operands into Q[2] is masked by the power consumed in accessing both registers by the unit and carrying out the dummy arithmetic operation.

Therefore, it is very difficult for an attacker to infer whether the content of Q[0] or Q[1] is being loaded into Q[2], and hence it will be difficult to identify whether the step involves a transition or no transition.

It should also be noted that a combined process implementation using the unit 1100 shown in FIG. 11 requires one additional cycle for the second process 800. The one cycle overhead for the second process 800 is not significant to the total number of cycles needed to perform each iteration of the process since point addition and point doubling require many modulo multiplication and addition operations which in turn require many cycles. Hence the added overhead of a single cycle for loading register Q[2] in the second process 800 is in fact not significant.

The first process 700 may be implemented using the components shown in FIG. 11 as follows. First, registers Q[0] and Q[1] are initialized to P and 2P, respectively. Control selection lines, S1 & S1', are used to load register Q[2] with either the content of register Q[0] or the content of register Q[1] based on existence of a transition or not. Control selection line, S2, is used to pass Q[1] as the second operand of an ADD operation. This line is fixed to "zero" in all iterations of the first process since the ADD operation is performed by a dedicated arithmetic unit. Control selection lines, S3 & S3', are used to select the result of DBL operation to be stored in Q[1].

The second process may be implemented using the same components and the same control lines as in the first process. The only difference between processes is that the DBL operation is performed first in case of the second process. Implementing the second process 800 by using the components shown in FIG. 11 can be summarized as follows. First, registers Q[0] and Q[1] are initialized to P and 2P, respectively. Control selection lines S1, S1' are used to load register Q[2] with either the content of register Q[0] or the content of register Q[1] based on based on existence of a transition or not. Control selection line, S2, is used to pass Q[1] as the second operand of an ADD operation. This line is fixed to "zero" in all iterations of the second process 800 since the DBL operation is performed by a dedicated arithmetic unit. Control selection lines S3, S3' is used to select the contents of Q[2] to be transferred to Q[1] (step 805).

The third process may also be implemented using the components shown in FIG. 11 as follows. First, registers Q[0] and Q[1] are randomly initialized to (P and 2P) or (2P and P). Register Q[2] is initialized to P. Control selection line, S1 & S1', is not used and register Q[2] has a fixed value (=P) in all iterations. Control selection line, S2, is used to pass the content of register Q[1] as the second input operand to the first ADD operation, or to pass Q[2] as the second input operand in case of the second ADD operation. In other words, S2=0 if the first ADD operation needs to be performed, and S2=1 when the second ADD operation needs to be performed. Note that this control line S2 is independent of the scalar bit values. Also, note that the first input operand for both first and second ADD operations is fixed to Q[0]. Control selection lines S3, S3' are used to select the result of the second ADD operation to be stored in Q[1].

The functions of selection lines under the three processes 700, 800, 900 are summarized in Table 11.

TABLE 11

| Selection Line | Function in case of process 700 | Function in case of process 800 | Function in case of process 900 |
|---|---|---|---|
| S1, S1' | Selects Q[0] when there is a transition or Q[1] when no transition | Selects Q[0] when there is a transition or Q[1] when no transition and select the result of DBL to be loaded into Q[2] | Not used |
| S2 | Selects Q[1] as the second input operand for an ADD operation. It fixed to "zero" | Selects Q[1] as the second input operand for an ADD operation. It fixed to "zero" | Selects Q[1] when performing the first ADD operation, or Q[2] when performing the second ADD operation |
| S3 & S3' | Selects the result of DBL operation | Selects Q[2] to be loaded in Q[1] (step 805). | Selects the result of the second ADD |

A number of exemplary implementations have been described. Nevertheless, it will be understood that various modifications may be made. For example, suitable results may be achieved if the steps of described techniques are performed in a different order and/or if components in a described components, architecture, or devices are combined in a different manner and/or replaced or supplemented by other components. Accordingly, other implementations are within the scope of the following claims.

What is claimed is:

1. A method of performing scalar multiplication which uses transition based method when traversing the scalar bits, comprising the steps of:

(1) providing an arithmetic processing unit to perform basic elliptic curve doubling (DBL) and addition (ADD) operations;
   (2) providing three registers Q[0], Q[1] and Q[2];
   (3) defining initial point values P and 2P;
   (4) setting Q[0] equal to P and Q[1] equal to 2P;
   (5) establishing a current scalar bit value $k_i$ and its predecessor bit value $k_{i-1}$;
   (6) starting from the next most significant bit, repeating the following steps (7) through (9) until all bits of the scalar are processed;
   (7) loading the register Q[2] with the contents of Q[0] or Q[1] based on the following: Q[2]=Q[0] if there is a transition from 1 to 0 or from 0 to 1 between the said current scalar bit value $k_i$ and its predecessor bit value $k_{i-1}$ otherwise Q[2]=Q[1] (i.e. Q[2]=Q[1-($k_i$ @ $k_{i-1}$)]);
   (8) performing an ADD operation on the contents of Q[0] and Q[1] and storing the result in Q[0] independently from the scalar bit value;
   (9) performing a DBL operation on the contents of Q[2] and storing the result in Q[1] independently from the scalar bit value; and,
   (10) returning Q[1-$k_0$].

2. A method of performing scalar multiplication which uses transition based method when traversing the scalar bits, comprising the steps of:
- (1) providing an arithmetic processing unit to perform basic elliptic curve doubling (DBL) and addition (ADD) operations;
- (2) providing three registers Q[0], Q[1] and Q[2];
- (3) defining initial point values P and 2P;
- (4) setting Q[0] equal to P and Q[1] equal to 2P;
- (5) establishing a current scalar bit value $k_i$ and its predecessor bit value $k_{i-1}$;
- (6) starting from the next most significant bit, repeating the following steps (7) through (9) until all bits of the scalar are processed;
- (7) performing DBL operation based on the following: Q[2]=DBL(Q[0]) if there is a transition from 1 to 0 or from 0 to 1 between the said current scalar bit value $k_i$ and its predecessor bit value $k_{i-1}$ otherwise Q[2]=DBL(Q[1]) (i.e. Q[2]=DBL (Q[1-($k_i$~$k_{i-1}$)])); (8) performing ADD operation on the contents of Q[0] and Q[1] and storing result in Q[0] independently from the scalar bit value;
- (9) storing Q[2] in Q[1] independently from the scalar bit value; and,
- (10) returning Q[1-$k_0$].

3. A method of performing scalar multiplication which uses transition based method when traversing the scalar bits, comprising the steps of:
- (1) providing an arithmetic processing unit to perform basic elliptic curve doubling (DBL) and addition (ADD) operations;
- (1) providing an arithmetic processing unit to perform basic elliptic curve doubling (DBL) and addition (ADD) operations;
- (2) providing three registers Q[0], Q[1] and Q[2];
- (3) defining initial point values P and 2P;
- (4) setting Q[0] equal to P, Q[1] equal to 2P and Q[2] equal to P; OR
setting Q[0] equal to 2P, Q[1] equal to P and Q[2] equal to P;
- (5) establishing a complement of the current scalar bit value 1-$k_i$;
- (6) starting from the next most significant bit, repeating the following steps (7) through (8) until all bits of the scalar are processed;
- (7) performing an ADD operation on the contents of Q[0] and Q[1] and storing the result in Q[0] independently from the scalar bit value;
- (8) performing an ADD operation based on the following: Q[1]—ADD(Q[0],Q[2]) if the said complement of the scalar bit value (1-$k_i$) is 0, otherwise Q[1]=ADD (Q[0], (-Q[2])); and,
- (9) returning Q[1-$k_0$].

4. A method of performing scalar multiplication which uses transition based method when traversing the scalar bits, comprising the steps of:
- (1) providing an arithmetic processing unit to perform basic elliptic curve doubling (DBL) and addition (ADD) operations;
- (2) providing three registers Q[0], Q[1] and Q[2];
- (3) defining initial point values P and 2P;
- (4) setting Q[2] equal to P;
- (5) establishing a complement of the next most significant bit (1-$k_{n-2}$) of the scalar K;
- (6) defining a random bit r.
- (7) setting the said random bit r to a random value from the range (0,1);
- (8) if the said random bit r is 0, setting Q[0] equal to P and Q[1] equal to 2P, otherwise setting Q[0] equal to 2P, Q[1] equal to P;
- (9) performing an ADD operation on the contents of Q[0] and Q[1] and storing the result in Q[0] independently from the scalar bit value;
- (10) performing an ADD operation based on the following: Q[1]—ADD(Q[0],Q[2]) if the said complement of the next most significant bit (1-$k_{n-2}$) is 0, otherwise Q[1]—ADD(Q[0],(-Q[2]));
- (11) establishing a current scalar bit value $k_i$ and its predecessor bit value $k_{i-1}$;
- (12) starting from the third most significant bit n-3, repeating the following steps (13) through (15) until all bits of the scalar are processed;
- (13) loading the variable Q[2] with the contents of Q[0] or Q[1] based on the following: Q[2]=Q[0] if there is a transition from 1 to 0 or from 0 to 1 between the said current scalar bit value $k_i$ and its predecessor bit value $k_{i-1}$ otherwise Q[2]=Q[1] (i.e. Q[2]=Q[1-($k_i$ @ $k_{i-1}$)]);
- (14) performing an ADD operation on the contents of Q[0] and Q[1] and storing the result in Q[0] independently from the scalar bit value;
- (15) performing a DBL operation on the contents of Q[2] and storing the result in Q[1] independently from the scalar bit value;
- (16) returning Q[1-$k_0$].

5. The method of claim 4 wherein the multiplication process provides a countermeasure to address bit analysis attacks since: (i) the said step (8) is random, (ii) the selection of source and destination registers of the said steps (9) and (10) is independent from the scalar bit value $k_i$, and (iii) the selection of the source register of the said step (13) is dependant on the existence of a transition between the values of bits $k_i$ and $k_{i-1}$ of the scalar, K, and not dependant on the value of $k_i$ directly.

6. A method of performing scalar multiplication which uses transition based method when traversing the scalar bits, comprising the steps of:
- (1) providing an arithmetic processing unit to perform basic elliptic curve doubling (DBL) and addition (ADD) operations;
- (2) providing three registers Q[0], Q[1] and Q[2];
- (3) defining initial point values P and 2P;
- (4) setting Q[2] equal to P;
- (5) establishing a complement of the next most significant bit (1-$k_{n-2}$) of the scalar K;
- (6) defining a random bit r.
- (7) setting the said random bit r to a random value from the range (0,1);
- (8) if the said random bit r is 0, setting Q[0] equal to P and Q[1] equal to 2P, otherwise setting Q[0] equal to 2P, Q[1] equal to P;
- (9) performing an ADD operation on the contents of Q[0] and Q[1] and storing the result in Q[0] independently from the scalar bit value;
- (10) performing an ADD operation based on the following: Q[1]=ADD(Q[0],Q[2]) if the said complement of the next most significant bit (1-$k_{n-2}$) is 0, otherwise Q[1]=ADD(Q[0],(-Q[2]));
- (11) establishing a current scalar bit value $k_i$ and its predecessor bit value $k_{i-1}$;
- (12) starting from the third most significant bit n-3, repeating the following steps (13) through (15) until all bits of the scalar are processed;

(13) performing a DBL operation based on the following: Q[2]=DBL(Q[0]) if there is a transition from 1 to 0 or from 0 to 1 between the said current scalar bit value $k.sub.i$ and its predecessor bit value $k.sub.i-1$ otherwise Q[2]=DBL(Q[1]) (i.e. Q[2]=DBL (Q[1−($k.sub.i$ $k.sub.i-1$)]));

(14) performing an ADD operation on the contents of Q[0] and Q[1] and storing result in Q[0] independently from the scalar bit value;

(15) storing Q[2] in Q[1] independently from the scalar bit value; and,

(16) returning Q[1−$k.sub.0$].

7. The method of claim 6 wherein the multiplication process provides a countermeasure to address bit analysis attacks since: (i) the said step 8 is random, (ii) the selection of source and destination registers of the said steps (9) and (10) is independent from the scalar bit value $k.sub.i$, and (iii) the selection of the input operand of the DBL operation of the said step (13) is dependant on the existence of a transition between the values of bits $k.sub.i$ and $k.sub.i-1$ of the scalar, K, and not dependant on the value of $k.sub.i$ directly.

8. A method of performing scalar multiplication which uses transition based method when traversing the scalar bits, comprising the steps of:

(1) providing an arithmetic processing unit to perform basic elliptic curve doubling (DBL) and addition (ADD) operations;

(2) providing three registers Q[0], Q[1] and Q[2];

(3) defining initial point values P and 2P;

(4) setting Q[2] equal to P;

(5) establishing a complement of the next most significant bit (1−$k.sub.n-2$) of the scalar K;

(6) defining a random bit r.

(7) setting the said random bit r to a random value from the range (0,1);

(8) if the said random bit r is 0, setting Q[0] equal to P and Q[1] equal to 2P, otherwise setting Q[0] equal to 2P, Q[1] equal to P;

(9) performing an ADD operation on the contents of Q[0] and Q[1] and storing the result in Q[0] independently from the scalar bit value;

(10) performing an ADD operation based on the following: Q[1]=ADD(Q[0],Q[2]) if the said complement of the next most significant bit (1−$k.sub.n-2$) is 0, otherwise Q[1]=ADD(Q[0],(−Q[2]));

(11) establishing a current scalar bit value $k.sub.i$ and its predecessor bit value $k.sub.i-1$;

(12) starting from the third most significant bit n−3, repeating the following steps (13) through (14) until all bits of the scalar are processed;

(13) setting the said random bit r to a random value from the range (0,1);

(14) if the said random bit r is 0, performing the following steps:

(14.1) loading the variable Q[2] with the contents of Q[0] or Q[1] based on the following: Q[2]=Q[0] if there is a transition from 1 to 0 or from 0 to 1 between the said current scalar bit value $k.sub.i$ and its predecessor bit value $k.sub.i-1$ otherwise Q[2]=Q[1] (i.e. Q[2]=Q[1−($k.sub.i$ @ $k.sub.i-1$)]);

(14.2) performing an ADD operation on the contents of Q[0] and Q[1] and storing the result in Q[0] independently from the scalar bit value;

(14.3) performing a DBL operation on the contents of Q[2] and storing the result in Q[1] independently from the scalar bit value;

Otherwise, i.e. r=1, performing the following steps:

(14.4) performing a DBL operation based on the following: Q[2]=DBL(Q[0]) if there is a transition from 1 to 0 or from 0 to 1 between the said current scalar bit value $k.sub.i$ and its predecessor bit value $k.sub.i-1$ otherwise Q[2]=DBL(Q[1]) (i.e. Q[2]=DBL (Q[1−($k.sub.i$ @ $k.sub.i-1$)]));

(14.5) performing an ADD operation on the contents of Q[0] and Q[1] and storing result in Q[0] independently from the scalar bit value;

(14.6) storing Q[2] in Q[1] independently from the scalar bit value; and,

(15) returning Q[1−$k.sub.0$].

9. The method of claim 8 wherein the multiplication process provides a countermeasure to address bit analysis attacks since: (1) the said step 8 is random, (2) the selection of source and destination registers of the said steps (9) and (10) is independent from the scalar bit value $k.sub.i$, (3) the said step (14) is random, (4) the selection of the source register of the said step (14.1) is dependant on the existence of a transition between the values of bits $k.sub.i$ and $k.sub.i-1$ of the scalar, K, and not dependant on the value of $k.sub.i$ directly, and (5) the selection of the input operand of the DBL operation of the said step (14.4) is dependant on the existence of a transition between the values of bits $k.sub.i$ and $k.sub.i-1$ of the scalar, K, and not dependant on the value of $k.sub.i$ directly.

* * * * *